United States Patent
Park et al.

(10) Patent No.: US 11,587,735 B2
(45) Date of Patent: Feb. 21, 2023

(54) MULTILAYER ELECTRONIC COMPONENT AND MANUFACTURING METHOD THEREOF

(71) Applicant: SAMSUNG ELECTRO-MECHANICS CO., LTD., Suwon-si (KR)

(72) Inventors: Jin Soo Park, Suwon-si (KR); Myung Jun Park, Suwon-si (KR); Hyun Hee Gu, Suwon-si (KR); Bum Soo Kim, Suwon-si (KR); Yeon Song Kang, Suwon-si (KR); Duk Hyun Chun, Suwon-si (KR); Chung Eun Lee, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 0 days.

(21) Appl. No.: 15/931,042

(22) Filed: May 13, 2020

(65) Prior Publication Data

US 2021/0265114 A1 Aug. 26, 2021

(30) Foreign Application Priority Data

Feb. 21, 2020 (KR) .................. 10-2020-0021455

(51) Int. Cl.
| | | |
|---|---|---|
| *H01G 4/008* | (2006.01) | |
| *H01G 4/232* | (2006.01) | |
| *H01G 4/248* | (2006.01) | |
| *H01G 4/30* | (2006.01) | |
| *H01G 4/12* | (2006.01) | |

(52) U.S. Cl.
CPC .......... *H01G 4/2325* (2013.01); *H01G 4/008* (2013.01); *H01G 4/248* (2013.01); *H01G 4/308* (2013.01); *H01G 4/1227* (2013.01)

(58) Field of Classification Search
CPC ...... H01G 13/006; H01G 4/008; H01G 4/012; H01G 4/12; H01G 4/1227; H01G 4/232; H01G 4/2325; H01G 4/248; H01G 4/308; H01G 4/1209; H01G 4/1236; H01G 4/1245; H01G 4/1218; H01G 4/30
USPC .................. 361/301.4, 500, 305; 174/260
See application file for complete search history.

(56) References Cited

U.S. PATENT DOCUMENTS

| | | | | |
|---|---|---|---|---|
| 2009/0226705 A1* | 9/2009 | Motoki | ............ | H01G 4/30 428/323 |
| 2009/0303655 A1* | 12/2009 | Ogawa | ............ | H01G 4/30 29/25.42 |
| 2012/0188682 A1* | 7/2012 | Sato | ............ | H01G 4/232 336/200 |

(Continued)

FOREIGN PATENT DOCUMENTS

| | | | | |
|---|---|---|---|---|
| JP | H08162357 A | * | 6/1996 | ............ H01G 2/06 |
| JP | 2008-300769 A | | 12/2008 | |
| KR | 10-2019-0116127 A | | 10/2019 | |

*Primary Examiner* — Timothy J Thompson
*Assistant Examiner* — Guillermo J Egoavil
(74) *Attorney, Agent, or Firm* — Morgan, Lewis & Bockius LLP

(57) ABSTRACT

A multilayer electronic component, in which the external electrode may be thinned to secure capacitance per unit volume, while securing the external electrode at a corner in a specific thickness or higher with improved reliability for moisture resistance.

20 Claims, 12 Drawing Sheets

(56) References Cited

U.S. PATENT DOCUMENTS

| | | | |
|---|---|---|---|
| 2016/0107229 A1* | 4/2016 | Okazaki | B29C 64/371 |
| | | | 425/78 |
| 2017/0186538 A1* | 6/2017 | Ando | H01G 4/30 |
| 2018/0337001 A1* | 11/2018 | Tozawa | H01F 17/0013 |
| 2019/0066923 A1* | 2/2019 | Jung | H01G 4/008 |
| 2019/0148070 A1* | 5/2019 | Kobayashi | H01G 4/232 |
| | | | 174/260 |
| 2020/0152387 A1* | 5/2020 | Takeuchi | H01G 4/1245 |
| 2020/0211775 A1* | 7/2020 | Onodera | H01G 4/012 |

\* cited by examiner

MULTILAYER ELECTRONIC COMPONENT AND MANUFACTURING METHOD THEREOF

CROSS-REFERENCE TO RELATED APPLICATION(S)

This application claims benefit of priority to Korean Patent Application No. 10-2020-0021455 filed on Feb. 21, 2020 in the Korean Intellectual Property Office, the disclosure of which is incorporated herein by reference in its entirety.

TECHNICAL FIELD

The present disclosure relates to a multilayer electronic component.

BACKGROUND

A multilayer ceramic capacitor (MLCC), a type of multilayer electronic component, may be a chip-type condenser mounted on the printed circuit boards of various electronic products such as imaging devices including liquid crystal displays (LCDs), plasma display panels (PDPs), and the like, and computers, smartphones, mobile phones, and the like, serving to charge or discharge electricity therein or therefrom.

Such multilayer ceramic capacitors may be used as components of various electronic devices due to their relatively small size, relatively high capacitance, and relative ease of mounting. As various electronic devices such as computers, mobile devices, or the like are miniaturized and increased in terms of output, demand for miniaturization and high capacitance of multilayer ceramic capacitors are increasing.

With trend for miniaturization and high capacitance in MLCC, the importance of increasing an effective volume ratio of MLCC (ratio of volume contributing capacitance to total volume) is increasing.

Conventionally, when forming an external electrode, a process of dipping a surface to which an internal electrode of a body is exposed into a paste may mainly be used by using a paste containing a conductive metal.

However, the external electrode formed by the dipping process may be not uniform in terms of thickness, and the external electrode may be formed to be excessively thin at corner portions of the body, while the external electrode may be formed to be excessively thick in other portions. Due thereto, there are problems that it is difficult to secure a high effective volume ratio, and a plating solution may penetrate into the body to decrease reliability of the MLCC, when the plating layer is formed on the external electrode in order to increase connectivity and mountability of the MLCC.

SUMMARY

An aspect of the present disclosure is to provide a multilayer electronic component having improved reliability for moisture resistance.

Another aspect of the present disclosure is to provide a multilayer electronic component having improved capacitance per unit volume.

However, the objects of the present disclosure are not limited to the above, and will be more easily understood in the course of describing the specific embodiment of the present disclosure.

According to an aspect of the present disclosure, a multilayer electronic component includes a body including a dielectric layer, and a first internal electrode and a second internal electrode alternately disposed in a first direction with the dielectric layer interposed therebetween, and including a first surface and a second surface opposing each other in the first direction, a third surface and a fourth surface connected to the first and second surfaces and opposing each other in a second direction, and a fifth surface and a sixth surface connected to the first to fourth surfaces and opposing each other in a third direction; a first external electrode including a 1a electrode layer disposed on the third surface, a 1b electrode layer disposed on the 1a electrode layer, a 1c electrode layer disposed on the first and second surfaces, and a 1d electrode layer disposed on the 1b electrode layer, and disposed to extend onto a portion of the 1c electrode layer; and a second external electrode including a 2a electrode layer disposed on the fourth surface, a 2b electrode layer disposed on the 2a electrode layer, a 2c electrode layer disposed on the first and second surfaces, and a 2d electrode layer disposed on the 2b electrode layer, and disposed to extend onto a portion of the 2c electrode layer.

According to an aspect of the present disclosure, a method for manufacturing a multilayer electronic component includes forming a body including a dielectric layer, and a first internal electrode and a second internal electrode alternately disposed in a first direction with the dielectric layer interposed therebetween, and including a first surface and a second surface opposing each other in the first direction, a third surface and a fourth surface connected to the first and second surfaces and opposing each other in a second direction, and a fifth surface and a sixth surface connected to the first to fourth surfaces and opposing each other in a third direction; forming, by a transfer process, a first electrode layer on one of the third and fourth surfaces and a second electrode layer on the first electrode layer; forming, by a first dipping process, a third electrode layer on the first surface, the second surface, and the one of the third and fourth surfaces to cover the second electrode layer and portions of the first and second surfaces; removing a portion of the third electrode layer formed on the one of the third and fourth surfaces; and forming, by a second dipping process, a fourth electrode layer to cover a remaining portion of the third electrode layer and to cover the second electrode layer.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
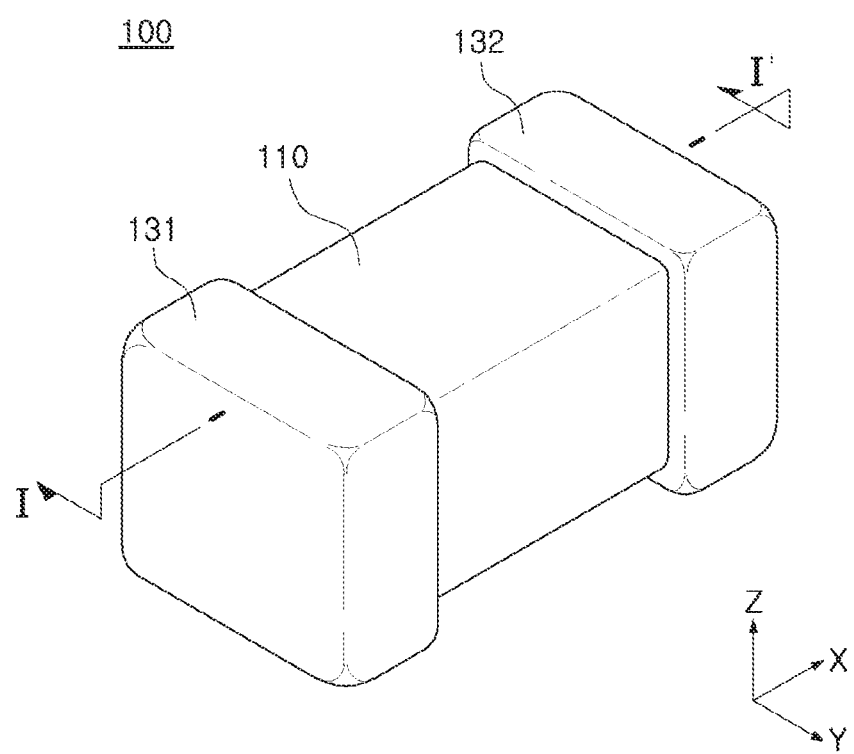
FIG. 1 schematically illustrates a perspective view of a multilayer electronic component according to an embodiment of the present disclosure.

Hereinafter, embodiments of the present disclosure will be described with reference to specific embodiments and the accompanying drawings. However, embodiments of the present disclosure may be modified into various other forms, and the scope of the present disclosure is not limited to the embodiments described below. Further, embodiments of the present disclosure may be provided for a more complete description of the present disclosure to the ordinary artisan. Therefore, shapes and sizes of the elements in the drawings may be exaggerated for clarity of description, and the elements denoted by the same reference numerals in the drawings may be the same elements.

In the drawings, portions not related to the description will be omitted for clarification of the present disclosure, and a thickness may be enlarged to clearly show layers and regions. The same reference numerals will be used to designate the same components in the same reference numerals. Further, throughout the specification, when an element is referred to as "comprising" or "including" an element, it means that the element may further include other elements as well, without departing from the other elements, unless specifically stated otherwise.

A value used to describe a parameter such as a 1-D dimension of an element including, but not limited to, "length," "width," "thickness," diameter," "distance," "gap," and/or "size," a 2-D dimension of an element including, but not limited to, "area" and/or "size," a 3-D dimension of an element including, but not limited to, "volume" and/or "size", and a property of an element including, not limited to, "roughness," "density," "weight," "weight ratio," and/or "molar ratio" may be obtained by the method(s) and/or the tool(s) described in the present disclosure. The present disclosure, however, is not limited thereto. Other methods and/or tools appreciated by one of ordinary skill in the art, even if not described in the present disclosure, may also be used.

In the drawings, an X direction may be defined as a second direction, an L direction, or a longitudinal direction, a Y direction may be defined as a third direction, a W direction, or a width direction of a body, and a Z direction may be defined as a first direction, a stacking direction, a T direction, or a thickness direction.

Multilayer Electronic Component

FIG. 1 schematically illustrates a perspective view of a multilayer electronic component according to an embodiment of the present disclosure.

Figure 2:
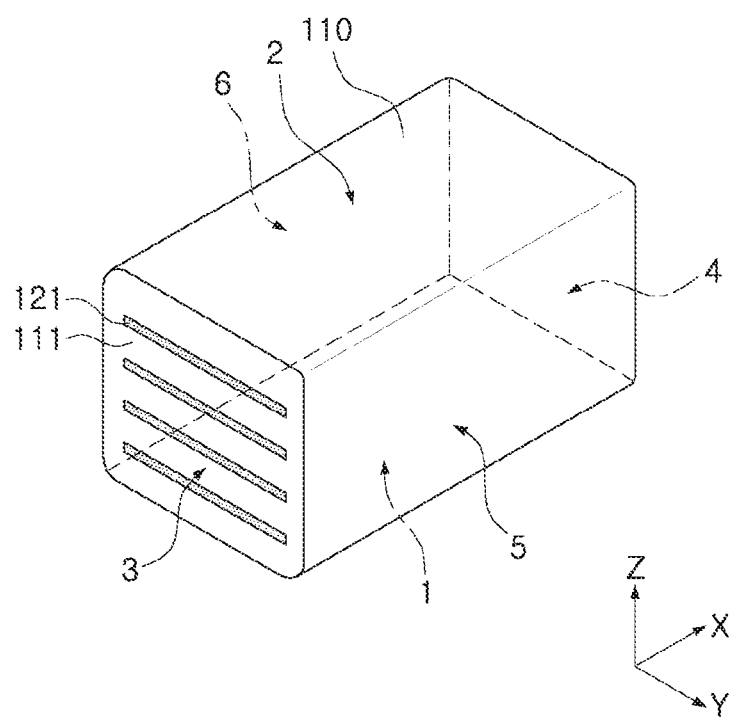
FIG. 2 schematically illustrates a perspective view of a body of a multilayer electronic component according to an embodiment of the present disclosure.

FIG. 2 schematically illustrates a perspective view of a body of a multilayer electronic component according to an embodiment of the present disclosure.

Figure 3:
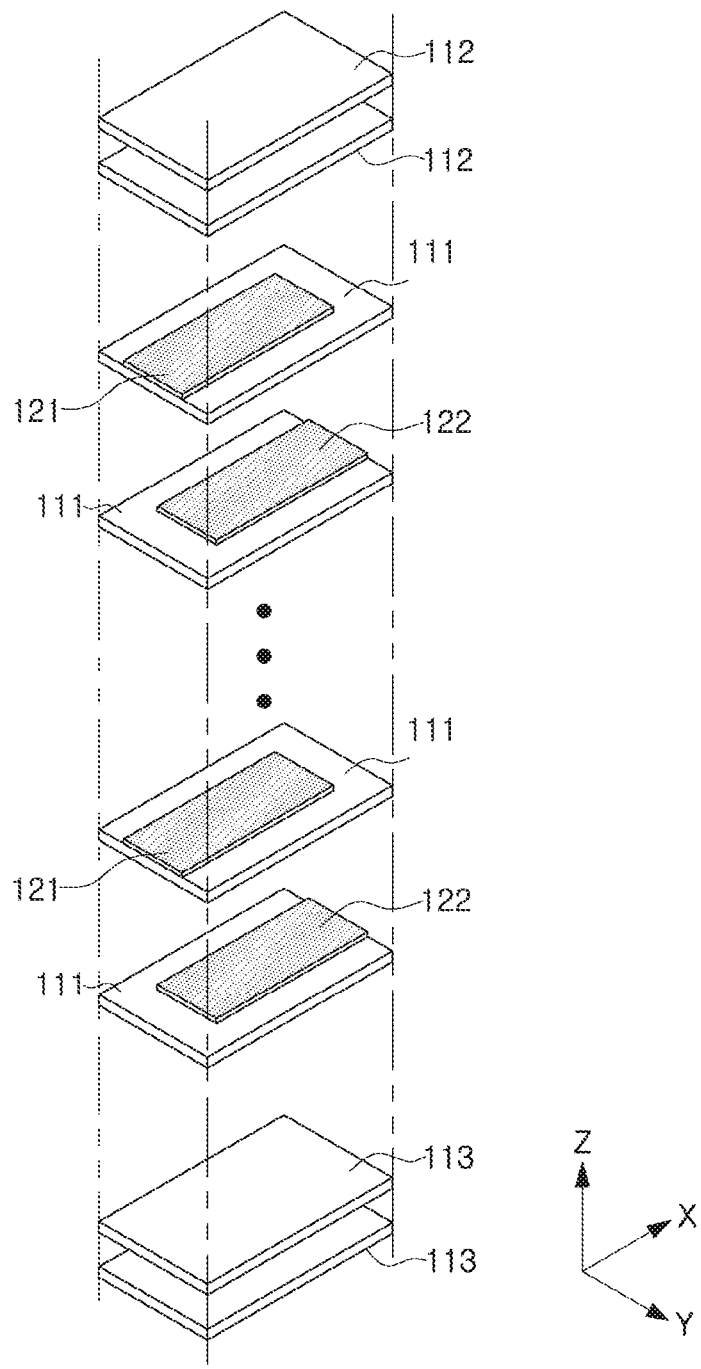
FIG. 3 is an exploded perspective view schematically illustrating an exploded body in which the dielectric layer and the internal electrode of FIG. 2 are stacked.

FIG. 3 is an exploded perspective view schematically illustrating an exploded body in which the dielectric layer and the internal electrode of FIG. 2 are stacked.

Figure 4:
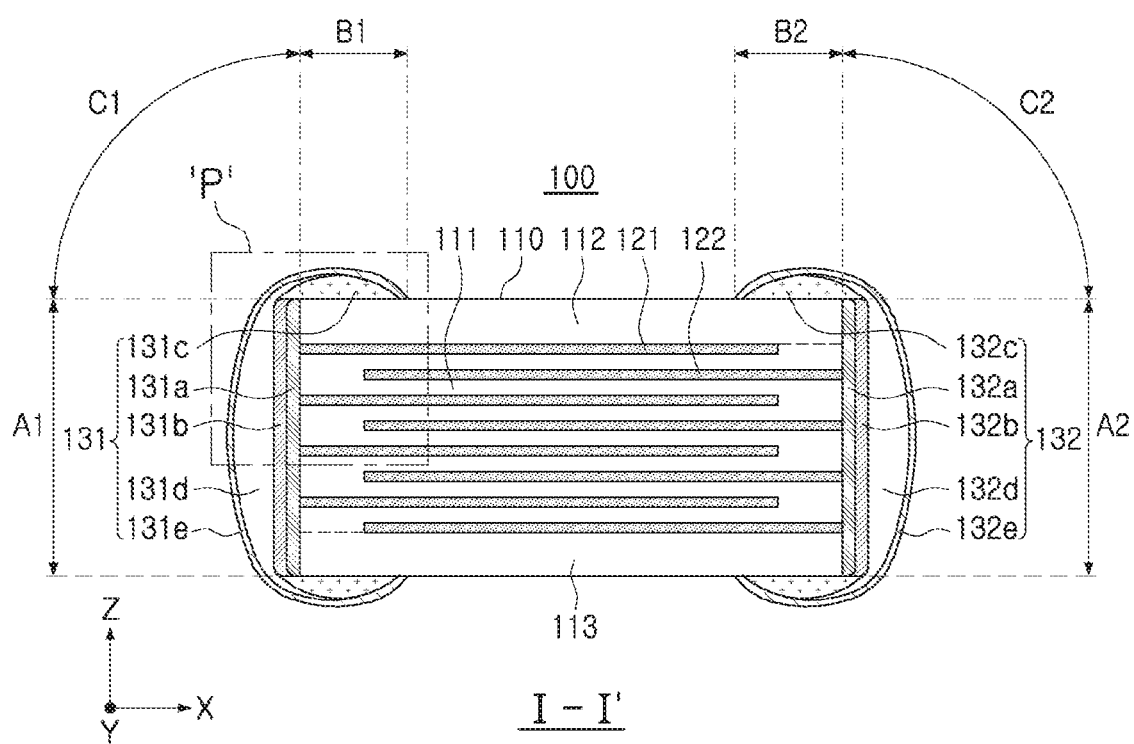
FIG. 4 is a cross-sectional view taken along line I-I' of FIG. 1.

FIG. 4 is a cross-sectional view taken along line I-I' of FIG. 1.

Figure 5:
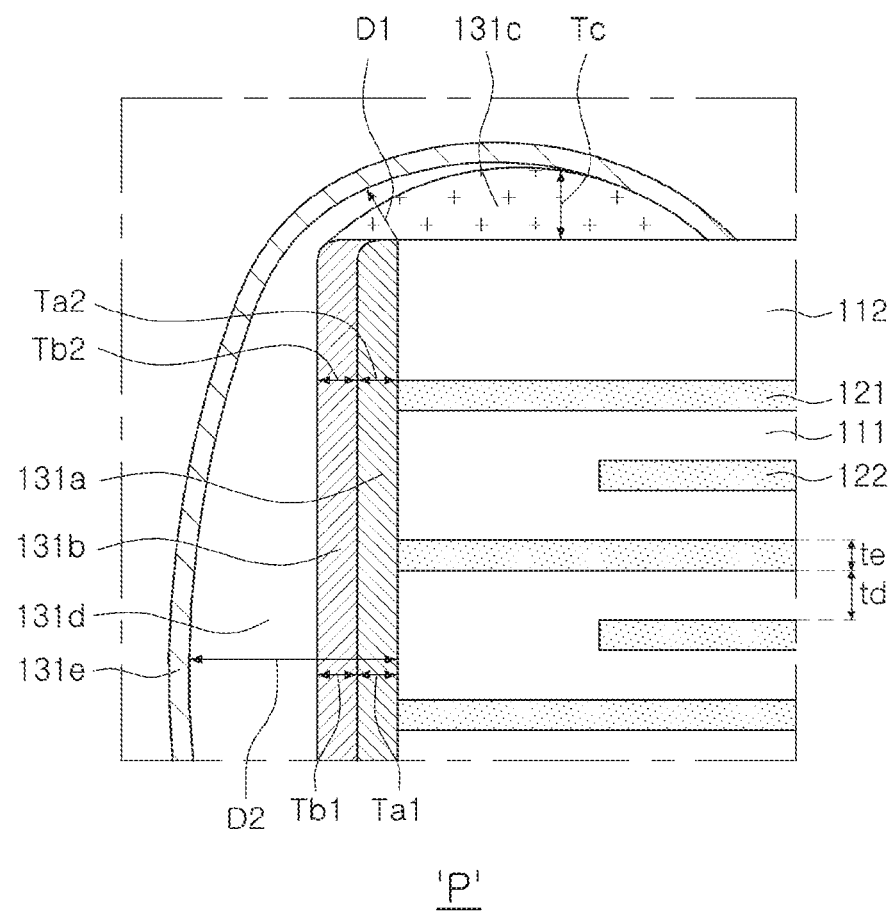
FIG. 5 is an enlarged view illustrating region P of FIG. 4.

FIG. 5 is an enlarged view illustrating region P of FIG. 4.

Hereinafter, a multilayer electronic component 100 according to an embodiment of the present disclosure will be described with reference to FIGS. 1 to 5.

The multilayer electronic component 100 according to an exemplary embodiment of the present disclosure may include a body 110 including a dielectric layer 111, and a first internal electrode 121 and a second internal electrode 122 alternately disposed in a first direction (a Z direction) with the dielectric layer 111 interposed therebetween, and including a first surface 1 and a second surface 2 opposing each other in the first direction, a third surface 3 and a fourth surface 4 connected to the first and second surfaces and opposing each other in a second direction (an X direction), and a fifth surface 5 and a sixth surface 6 connected to the first to fourth surfaces 1 to 4 and opposing each other in a third direction (a Y direction); a first external electrode 131 including a 1a electrode layer 131a disposed on the third surface, a 1b electrode layer 131b disposed on the 1a electrode layer, a 1c electrode layer 131c disposed on the first and second surfaces 1 and 2, and a 1d electrode layer 131d disposed on the 1b electrode layer, and disposed to extend onto a portion of the 1c electrode layer; and a second external electrode 132 including a 2a electrode layer 132a disposed on the fourth surface, a 2b electrode layer 132b disposed on the 2a electrode layer, a 2c electrode layer 132c disposed on the first and second surfaces 1 and 2, and a 2d electrode layer 132d disposed on the 2b electrode layer, and disposed to extend onto a portion of the 2c electrode layer.

In the body 110, the dielectric layers 111 and the internal electrodes 121 and 122 may be alternately stacked.

A specific shape of the body 110 is not particularly limited, but as illustrated, the body 110 may be formed to have a hexahedral or similar shape. Due to shrinkage of ceramic powder contained in the body 110 during a firing process, the body 110 may not have a perfectly hexahedral shape with completely straight lines, but may have a substantially hexahedral shape.

The body 110 may have the first and second surfaces 1 and 2 opposing each other in the first direction (the Z direction), the third and fourth surfaces 3 and 4 connected to the first and second surfaces 1 and 2 and opposing each other in the second direction (the X direction), and the fifth and sixth surfaces 5 and 6 connected to the first and second surfaces 1 and 2, connected to the third and fourth surfaces 3 and 4, and opposing each other in the third direction (the Y direction).

A plurality of dielectric layers 111 forming the body 110 may be in a fired state, and a boundary between adjacent dielectric layers 111 may be integrated to such an extent that it is difficult to identify the device without using a scanning electron microscope (SEM).

According to an embodiment of the present disclosure, a raw material for forming the dielectric layer 111 is not particularly limited, as long as sufficient capacitance may be obtained. For example, a barium titanate-based material, a lead composite perovskite-based material, a strontium titanate-based material, or the like may be used. The barium titanate-based material may include a $BaTiO_3$-based ceramic powder, and examples of the ceramic powder may include $BaTiO_3$, or $(Ba_{1-x}Ca_x)TiO_3$, $Ba(Ti_{1-y}Ca_y)O_3$, $(Ba_{1-x}Ca_x)$ $(Ti_{1-y}Zr_y)O_3$, or Ba $(Ti_{1-y}Zr_y)O_3$, in which calcium (Ca), zirconium (Zr), or the like is partially dissolved into $BaTiO_3$, or the like.

As the material for forming the dielectric layer 111, various ceramic additives, organic solvents, plasticizers, binders, dispersants, or the like may be added to powder particles such as barium titanate ($BaTiO_3$) according to the purpose of the present disclosure.

The body 110 may include a capacitance forming portion disposed in the body 110 and including the first internal electrode 121 and the second internal electrode 122 disposed to oppose each other with the dielectric layer 111 interposed therebetween, to form capacitance; and an upper protective layer 112 and a lower protective layer 113 formed on the capacitance forming portion, respectively, in upward and downward directions.

The capacitance forming portion may be a portion for contributing to formation of capacitance of the capacitor, and may be formed by repeatedly stacking the plurality of first and second internal electrodes 121 and 122 with the dielectric layer 111 interposed therebetween.

The upper protective layer 112 and the lower protective layer 113 may be formed by stacking a single dielectric layer or two or more dielectric layers on upper and lower surfaces of the capacitance forming portion, respectively, in a vertical direction, and may basically play a role in preventing damage to the internal electrodes due to physical or chemical stress.

The upper protective layer 112 and the lower protective layer 113 may not include an internal electrode, and may include the same material as the dielectric layer 111.

The internal electrodes 121 and 122 may include first and second internal electrodes 121 and 122. The first and second internal electrodes 121 and 122 may be alternately arranged to oppose each other with the dielectric layer interposed therebetween, and may be exposed from the third and fourth surfaces 3 and 4 of the body 110, respectively.

Referring to FIGS. 2 to 4, the first internal electrode 121 may be spaced apart from the fourth surface 4 and may be exposed from the third surface 3, and the second internal electrode 122 may be spaced apart from the third surface 3 and may be exposed from the fourth surface 4.

In this case, the first and second internal electrodes 121 and 122 may be electrically separated from each other by the dielectric layer 111 interposed therebetween.

Referring to FIG. 3, the body 110 may be formed by alternately stacking a ceramic green sheet on which the first internal electrode 121 is printed and a ceramic green sheet on which the second internal electrode 122 is printed, and then firing the stacked ceramic green sheet.

A material for forming the internal electrodes 121 and 122 is not particularly limited. For example, the internal electrodes 121 and 122 may be formed by printing a conductive paste for internal electrodes containing one or more of nickel (Ni), copper (Cu), palladium (Pd), silver (Ag), gold (Au), platinum (Pt), tin (Sn), tungsten (W), titanium (Ti), and alloys thereof, on a ceramic green sheet.

As a printing method of the conductive paste for internal electrodes, a screen-printing method or a gravure printing method may be used, but the present disclosure is not limited thereto.

In order to achieve miniaturization and high capacitance of the multilayer ceramic capacitor, the number of stacked bodies should be increased by reducing thicknesses of the dielectric layer and the internal electrode, and characteristics of insulation resistance, breakdown voltage, or the like may be deteriorated, as the thicknesses of the dielectric layer and the internal electrode become thinner.

Therefore, as the thicknesses of the dielectric layer and the internal electrode become thinner, an effect of improving reliability according to the present disclosure may be increased.

Particularly, when a thickness (te) of the internal electrodes 121 and 122 or a thickness (td) of the dielectric layer 111 is 0.41 µm or less, effects of improving high temperature lifetime characteristics and TCC characteristics according to the present disclosure may be remarkable improved.

The thickness (te) of the internal electrodes 121 and 122 may refer to an average thickness of the first and second internal electrodes 121 and 122.

The thickness (te) of the internal electrodes 121 and 122 may be measured by scanning an image of a cross-section in the third and first directions (an L-T cross-section) of the body 110 by a scanning electron microscope (SEM).

For example, on the basis of a reference internal electrode layer at a point at which a center line in the longitudinal direction of the body and a center line in the thickness direction of the body meet, a thickness (te) of the internal electrodes 121 and 122 may be determined by defining two points to the left and two points to the right from a reference center point in the reference internal electrode layer at equal intervals, measuring a thickness of each of the defined points, and obtaining an average value therefrom, for five internal electrode layers including the reference internal electrode layer, and two upper internal electrode layers and two lower internal electrode layers, respectively arranged on and below the reference internal electrode layer, among the internal electrode layers extracted from an image of a cross-section in the third and first directions (an L-T cross-section) of the body 110, cut in a central portion of the body 110 in the width direction, scanned by a scanning electron microscope (SEM).

For example, since a thickness at the reference center point in the reference internal electrode layer at a point at which a center line in the longitudinal direction of the body and a center line in the thickness direction of the body meet, and a thickness at each of the two points to the left and right from the reference center point at equal intervals (e.g., each 500 nm), for the above five internal electrode layers, may be measured, the thickness (te) of the internal electrodes 121 and 122 may be determined as an average value of the thicknesses of the total 25 points.

The thickness (td) of the dielectric layer 111 may refer to an average thickness of the dielectric layer 111 disposed between the first and second internal electrodes 121 and 122.

Similar to the thickness (te) of the internal electrode, the thickness (td) of the dielectric layer 111 may be measured by scanning an image of a cross-section in the third and first directions (an L-T cross-section) of the body 110 by a scanning electron microscope (SEM).

For example, on the basis of a reference dielectric layer at a point at which a center line in the longitudinal direction of the body and a center line in the thickness direction of the body meet, a thickness (td) of the dielectric layer 111 may be determined by defining two points to the left and two points to the right from a reference center point in the reference dielectric layer at equal intervals, measuring a thickness of each of the defined points, and obtaining an average value therefrom, for five dielectric layers including the reference dielectric layer, and two upper dielectric layers and two lower dielectric layers, respectively arranged on and below the reference dielectric layer, among the dielectric layers extracted from an image of a cross-section in the third and first directions (an L-T cross-section) of the body 110, cut in a central portion of the body 110 in the width direction, scanned by a scanning electron microscope (SEM).

For example, since a thickness at the reference center point in the reference dielectric layer at a point at which a center line in the longitudinal direction of the body and a center line in the thickness direction of the body meet, and a thickness at each of the two points to the left and right from the reference center point at equal intervals (e.g., each 500 nm), for the above five dielectric layers, may be measured, the thickness (td) of the dielectric layer 111 may be determined as an average value of the thicknesses of the total 25 points.

The external electrodes 131 and 132 may be arranged on the body 110, and may be connected to the internal electrodes 121 and 122, respectively. In addition, the external electrodes 131 and 132 may include first and second external electrodes 131 and 132 disposed on the third and fourth surfaces 3 and 4 of the body 110, respectively, and connected to the first and second internal electrodes 121 and 122, respectively.

In this embodiment, a structure in which the multilayer electronic component 100 has two external electrodes 131 and 132 may be described, but the number, shape, and the like of the external electrodes 131 and 132 may be changed, depending on shapes of the internal electrodes 121 and 122, or other purposes.

The first external electrode 131 may include the 1a electrode layer 131a disposed on the third surface of the body 110, the 1b electrode layer 131b disposed on the 1a electrode layer, the 1c electrode layer 131c disposed on the first and second surfaces 1 and 2 of the body 110, and the 1d electrode layer 131d disposed on the 1b electrode layer, and disposed to extend onto a portion of the 1c electrode layer.

The second external electrode 132 may include the 2a electrode layer 132a disposed on the fourth surface of the body 110, the 2b electrode layer 132b disposed on the 2a electrode layer, the 2c electrode layer 132c disposed on the first and second surfaces 1 and 2 of the body 110, and the 2d electrode layer 132d disposed on the 2b electrode layer, and disposed to extend onto a portion of the 2c electrode layer.

Hereinafter, the first external electrode 131 will be mainly described, but the same may be applied to the second external electrode 132.

Conventionally, external electrodes were formed by dipping exposed surfaces of first and second internal electrodes, respectively, into a conductive paste.

The external electrode formed by a dipping process, as above, may be not uniform in thickness of the external electrode, and the external electrode may be formed too thin in a corner portion of the body, while the external electrode may be formed too thick in the other portion of the body.

When the external electrode is formed thin in the corner portion of the body, the external electrode may act as a water penetration path to reduce reliability for moisture resistance. Therefore, the external electrode should be formed thicker to secure the external electrode in the corner portion to a predetermined thickness or more. Therefore, there are problems in that a capacitance or mounting density per unit volume was lowered, or plating defects due to glass beading or blister occur.

Therefore, there has been an attempt to form an external electrode thin by transferring the electrode sheet to the body. According to this, since the external electrode is thinned, it was effective in terms of improvement in capacitance per unit volume, but reliability for moisture resistance is lowered because a thickness of the external electrode at the corner is too thin.

Therefore, the present disclosure is to provide a multilayer electronic component, in which the external electrode may be thinned to secure capacitance per unit volume, while securing the external electrode at a corner in a specific thickness or higher with improved reliability for moisture resistance.

As illustrated in FIG. 4, when the first external electrode 131 is divided into portions according to a position to be disposed, the first external electrode 131 may include a first connection portion A1 disposed on the third surface 3 of the body 110, a first band portion B1 disposed on the first and second surfaces 1 and 2, and a first corner portion C1 that may be a region between the first connection portion and the first band portion. When the second external electrode 132 is divided into portions according to a position to be disposed, the second external electrode 132 may include a second connection portion A2 disposed on the fourth surface 4 of the body 110, a second band portion B2 disposed on the first and second surfaces 1 and 2, a second corner portion C2 that may be a region between the second connection portion and the second band portion. Further, the first and second band portions B1 and B2 may be arranged on the fifth and sixth surfaces 5 and 6.

Referring to FIG. 5, according to an embodiment of the present disclosure, when a paste is applied or dipped in order to form the fourth electrode layer 131d, the first electrode layer 131a and the first electrode layer 131b may be arranged on the first connection portion A1, and the third electrode layer 131c may be disposed on the first band portion B1, to sufficiently secure a region in which a paste is applied to a corner portion of the body, such that the corner portion C1 of the external electrode have a thickness (D1), greater than a certain thickness.

Figure 6:
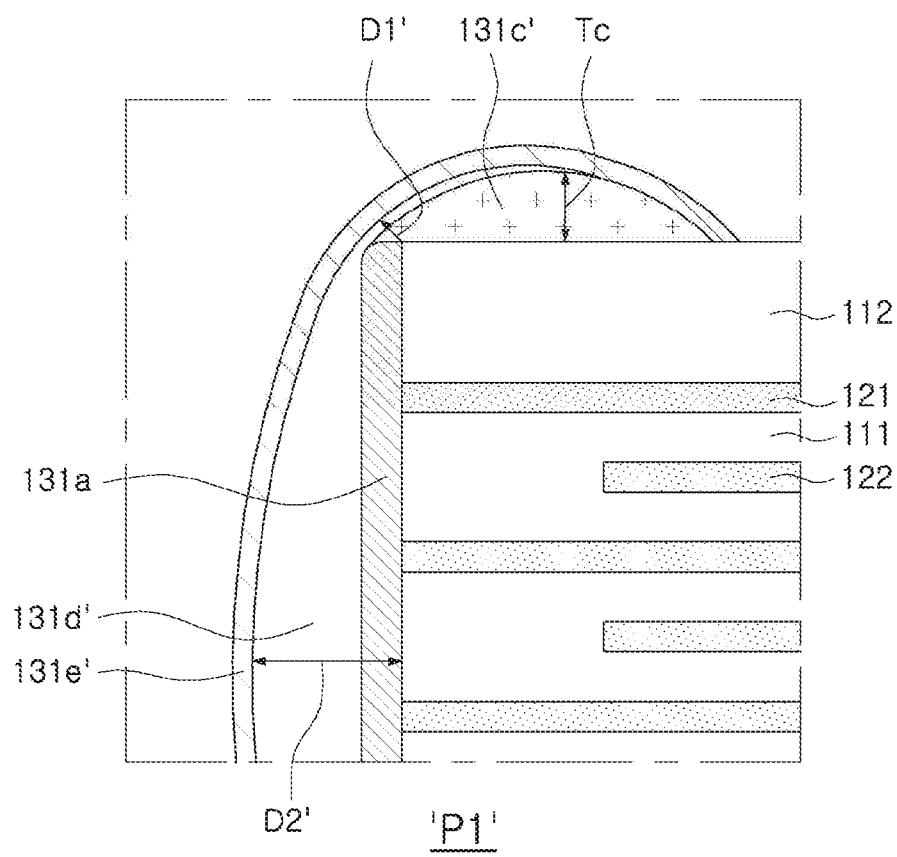
FIG. 6 is a view of Comparative Example, and illustrates region P1 corresponding to the region P of FIG. 4.

FIG. 6 is a view of Comparative Example, and illustrates region P1 corresponding to the region P of FIG. 4. In the Comparative Example, when only the first electrode layer 131a is formed on the first connection portion A1 and the second electrode layer 131b is not disposed on the first connection portion A1, a region in which a paste is applied to a corner portion of the body may not be sufficiently secured, and it may be difficult to sufficiently secure a thickness (D1') of the corner portion of the external electrode.

Figure 7:
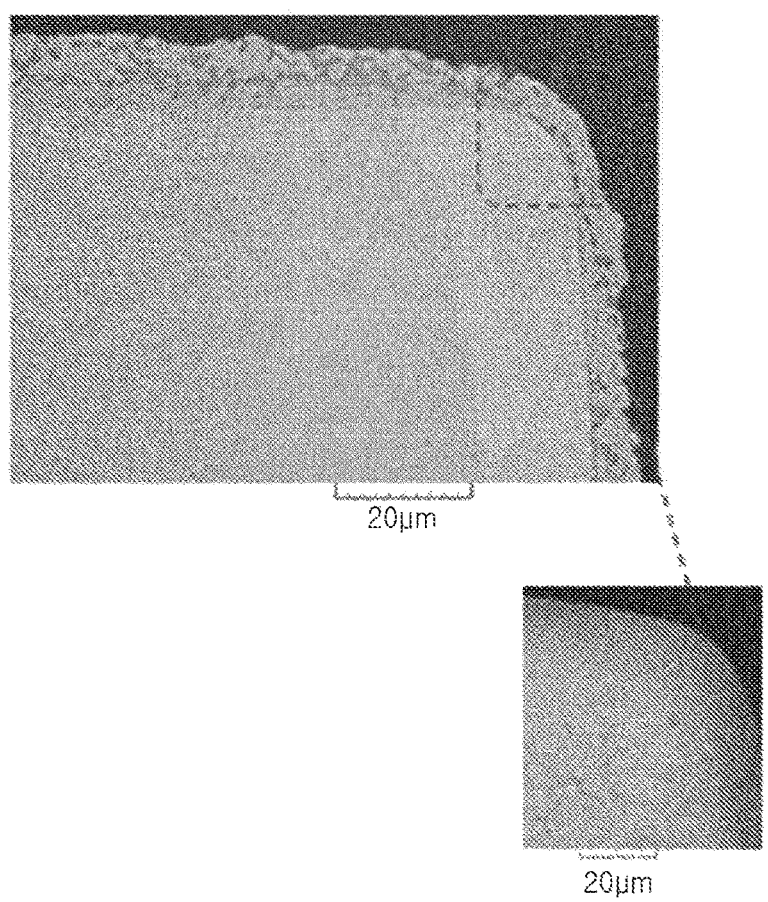
FIG. 7 is a photograph in which a cross-sectional view of a multilayer electronic component is captured, and a photograph in which an outer surface of a corner portion is captured, according to an embodiment of the present disclosure.

FIG. 7 is a photograph (an upper photograph) in which a cross-sectional view of a multilayer electronic component is captured, and a photograph (a lower photograph) in which an outer surface of a corner portion is captured, according to an embodiment of the present disclosure.

Figure 8:
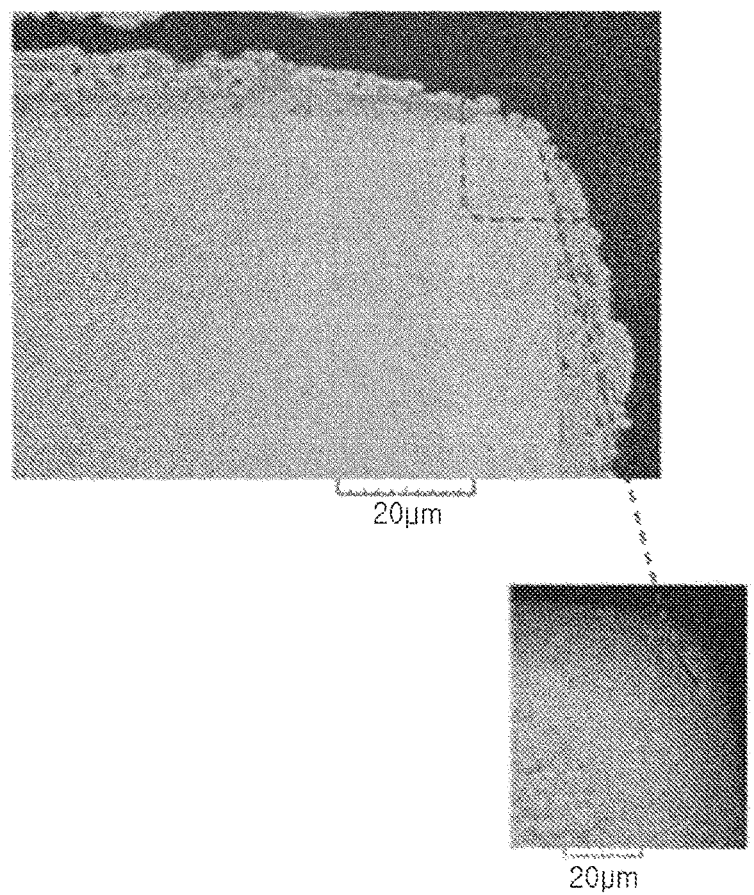
FIG. 8 is a photograph in which a cross-sectional view of a multilayer electronic component is captured, and a photograph in which an outer surface of a corner portion is captured, according to Comparative Example.

FIG. 8 is a photograph (an upper photograph) in which a cross-sectional view of a multilayer electronic component is captured, and a photograph (a lower photograph) in which an outer surface of a corner portion is captured, according to Comparative Example.

By comparing FIGS. 7 and 8, a thickness of the external electrode at the corner portion may be sufficiently secured according to an embodiment of the present disclosure, and thus, it can be confirmed that the external electrode or the plating layer is not disconnected even at an outer surface of the corner portion. In the case of the Comparative Example, the thickness of the external electrode at the corner portion may be not sufficiently secured, and thus, it can be confirmed that the external electrode or the plating layer was disconnected even at the outer surface of the corner portion.

In addition, reliability for moisture resistance was evaluated by preparing thirty (30) sample chips having an external electrode, as Inventive Examples, according to an embodiment of the present disclosure and thirty (30) sample chips having an external electrode, as Comparative Examples, according to the Comparative Example, respectively, and applying a voltage of 4V for 5 hours thereto at a temperature of 85° C. and a relative humidity of 85%.

The sample chip of Inventive Example had excellent reliability for moisture resistance, with zero (0) sample chip having insulation resistance value lowered to 1/10 or less, compared to an initial value of the insulation resistance.

The sample chip of Comparative Example had inferior reliability for moisture resistance, with four (4) sample chips having insulation resistance value lowered to 1/10 or less, among the thirty (30) sample chips, compared to an initial value of the insulation resistance.

The 1a electrode layer 131a may be disposed on the third surface 3 of the body 110. The 1a electrode layer 131a may be connected to the first internal electrode 121 and may electrically connect the first external electrode 131 and the first internal electrode 121.

The 2a electrode layer 132a may be disposed on the fourth surface 4 of the body 110. The 2a electrode layer 132a may be connected to the second internal electrode 122 and may electrically connect the second external electrode 132 and the second internal electrode 122.

The 1a and 2a electrode layers 131a and 132a may include a metal material having high electrical conductivity, and include the same metal as the internal electrodes 121 and 122 to increase electrical connectivity with the internal electrodes 121 and 122. For example, one or more of nickel (Ni), copper (Cu), palladium (Pd), silver (Ag), gold (Au), platinum (Pt), tin (Sn), tungsten (W), titanium (Ti), and alloys thereof may be included.

The 1a and 2a electrode layers 131a and 132a may be provided in the form of a sintered electrode. In this case, the 1a and 2a electrode layers 131a and 132a before sintering may be transferred to the body 110 in a state including organic materials such as metal particles and a binder, and the organic materials or the like after sintering may be removed therefrom.

The 1b electrode layer 131b may be disposed on the 1a electrode layer 131a. The 1b electrode layer 131b may electrically connect the 1a electrode layer 131a and the 1d electrode layer 131d, and may secure bonding strength. In addition, the corner portion C1 of the external electrode may perform a role of sufficiently securing a region in which paste may be applied to the corner portion of the body, together with the 1a electrode layer 131a, to have a thickness (D) of a predetermined value or more.

The 2b electrode layer 132b may be disposed on the 2a electrode layer 132a. The 2b electrode layer 132b may electrically connect the 2a electrode layer 132a and the 2d electrode layer 132d, and may secure bonding strength. In addition, the corner portion C2 of the external electrode may perform a role of sufficiently securing a region in which paste may be applied to the corner portion of the body, together with the 2a electrode layer 132a, to have a thickness having a predetermined value or more.

The 1b and 2b electrode layers 131b and 132b may include a metal material having high electrical conductivity, and include the same metal as the 1d and 2d electrode layers 131d and 132d to increase electrical connectivity with the 1d and 2d electrode layers 131d and 132d. For example, one or more of nickel (Ni), copper (Cu), palladium (Pd), silver (Ag), gold (Au), platinum (Pt), tin (Sn), tungsten (W), titanium (Ti), and alloys thereof may be included.

The 1b and 2b electrode layers 131b and 132b may be provided in the form of sintered electrodes, in a similar manner to the 1a and 2a electrode layers 131a and 132a. In this case, the 1b and 2b electrode layers 131b and 132b before sintering may be transferred to the body 110 in a state including organic materials such as metal particles and a binder, and the organic materials or the like may be removed therefrom after sintering.

According to an embodiment of the present disclosure, the 1a electrode layer 131a may include the same metal as the first internal electrode 121, and the 1b electrode layer 131b may include the same metal as the 1d electrode layer 131d.

In order to sufficiently secure a region to which a paste may be applied to a corner portion of the body, a method of increasing a thickness of the first electrode layer 131a without disposing the first electrode layer 131b may be considered. In this case, bonding strength may not be sufficiently secured. Further, even when the 1a electrode layer 131a and the 1b electrode layer 131b contain the same metals, bonding strength may not be sufficiently secured.

When the 1a electrode layer 131a includes the same metal as the first internal electrode 121, and the 1b electrode layer 131b includes the same metal as the 1d electrode layer 131d, bonding strength with the body 110 and bonding strength with the 1d and 2d electrode layers 131d and 132d may be simultaneously secured.

For a more specific example, since, in general, the internal electrode may include Ni, and the 1d electrode layer 131d may include Cu, the 1a electrode layer 131a may be formed by transferring a sheet containing Ni, and the 1b electrode layer 131b may be formed by transferring a sheet containing Cu.

In addition, one or more additional electrode layers (not illustrated) may be further disposed between the 1b electrode layer 131b and the 1d electrode layer 131d. The number of additional electrode layers is not particularly limited, but the number of additional electrode layers may be determined in consideration of bonding strength and a final thickness of the external electrode.

A first additional electrode layer may also be formed in the same manner as the 1a and 1b electrode layers 131a and 131b.

The 1c and 2c electrode layers 131c and 132c may be arranged on the first and second surfaces 1 and 2 of the body 110. The 1c and 2c electrode layers 131c and 132c may perform a role of sufficiently securing a region in which paste may be applied to the corner portion of the body, together with the 1a and 1b electrode layers 131a and 131b and the 2a and 2b electrode layers 132a and 132b, to have a thickness (D) of a predetermined value or more in the corner portions C1 and C2 of the external electrode. In this case, the 1c and 2c electrode layers 131c and 132c may be arranged on the fifth and sixth surfaces of the body.

The 1c and 2c electrode layers 131c and 132c may be formed by dipping the body 110 on which the 1a, 1b, 2a, and 2b electrode layers are formed in a conductive paste containing a conductive metal and glass, and removing the paste from a connection portion.

A conductive metal included in the 1c and 2c electrode layers 131c and 132c is not particularly limited. For example, one or more of nickel (Ni), copper (Cu), palladium (Pd), silver (Ag), gold (Au), platinum (Pt), tin (Sn), tungsten (W), titanium (Ti), and alloys thereof may be included.

The 1d electrode layer 131d may be disposed on the 1b electrode layer 131b, and may be disposed to extend to a portion on the 1c electrode layer 131c. The 2d electrode layer 132d may be disposed on the 2b electrode layer 132b, and may be disposed to extend to a portion on the 2c electrode layer 131c.

The 1d and 2d electrode layers 131d and 132d may be formed by dipping the body 110 on which the 1a, 1b, 1c, 2a, 2b, and 2c electrode layers are formed to a conductive paste containing a conductive metal and glass, and removing the paste on a connection portion.

A conductive metal included in the 1d and 2d electrode layers 131d and 132d is not particularly limited. For example, one or more of nickel (Ni), copper (Cu), palladium (Pd), silver (Ag), gold (Au), platinum (Pt), tin (Sn), tungsten (W), titanium (Ti), and alloys thereof may be included.

Figure 9:
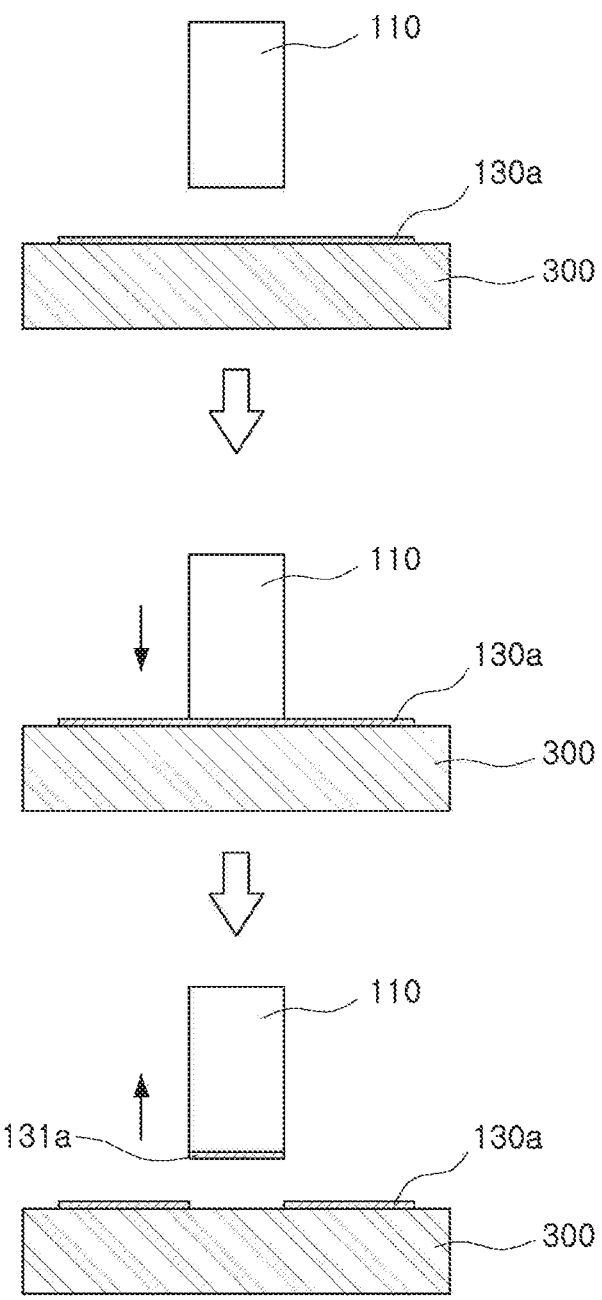
FIG. 9 is a view illustrating an operation of forming a 1a electrode layer by a transfer process.
Figure 10:
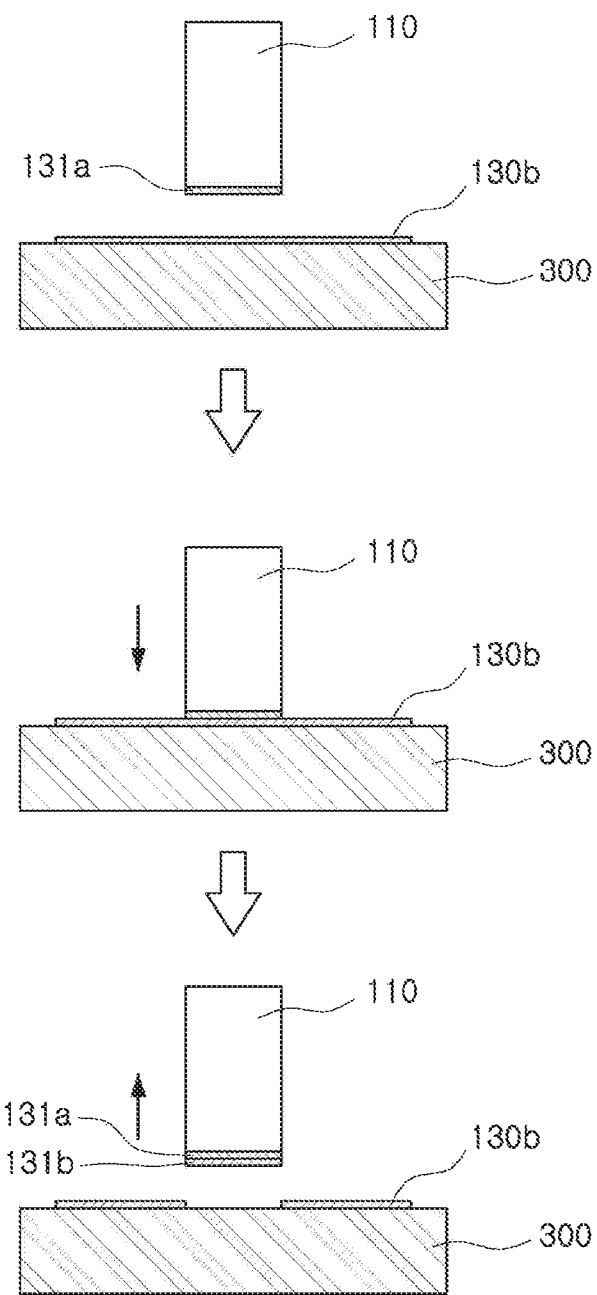
FIG. 10 is a view illustrating an operation of forming a 1b electrode layer by a transfer process.
Figure 11:
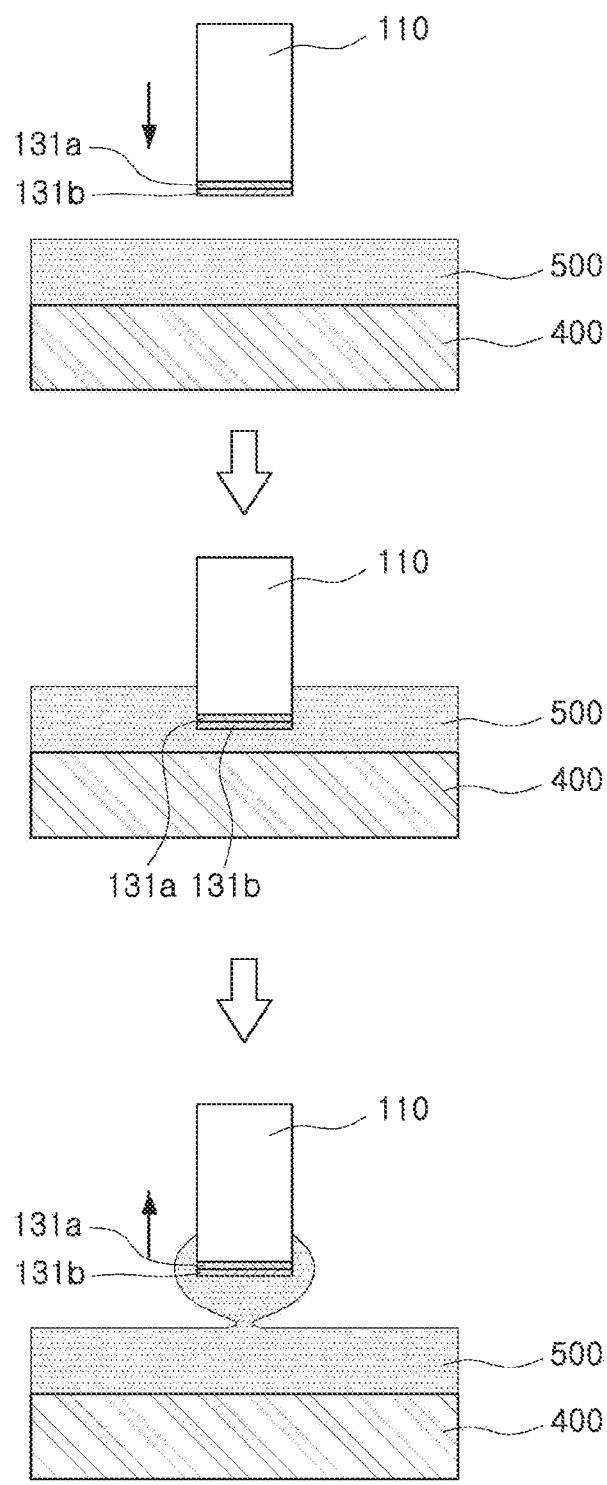
FIGS. 11 and 12 are views illustrating a process of forming a 1c electrode layer.
Figure 12:
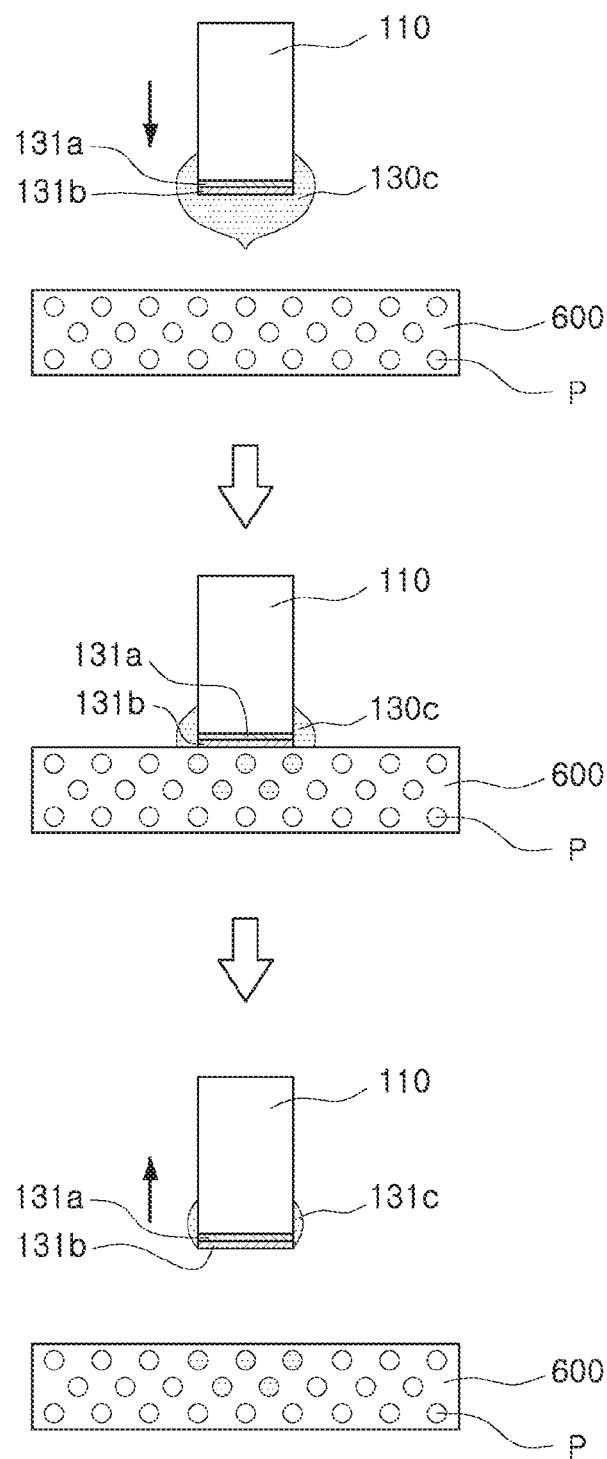

FIG. 9 is a view illustrating an operation of forming a 1a electrode layer by a transfer process. FIG. 10 is a view illustrating an operation of forming a 1b electrode layer by a transfer process. FIGS. 11 and 12 are views illustrating a process of forming a 1c electrode layer.

Referring to FIGS. 9 to 12, as illustrated in FIG. 9, in a case of a transfer process of a 1a electrode layer 131a, a 1a electrode layer sheet 130a may be provided on a support 300, and a body 110 may be pressed against the 1a electrode layer sheet 130a to adhere a 1a electrode layer 131a to a surface of the body 110. The 1a electrode layer sheet 130a may be a state before sintering, and may contain components such as a binder, an organic solvent, or the like.

Thereafter, as illustrated in FIG. 10, in a case of a transfer process of a 1b electrode layer 131b, a 1b electrode layer sheet 130b may be provided on a support 300, and a body 110 may be pressed against the 1b electrode layer sheet 130b to adhere a 1b electrode layer 131b to a surface of a 1a electrode layer 131a. The 1b electrode layer sheet 130b may be a state before sintering, and may contain components such as a binder, an organic solvent, or the like.

Thereafter, as illustrated in FIG. 11, a conductive paste 500 may be provided on a surface plate 400, a body 110 may be dipped into the conductive paste 500 to form an electrode layer 130c, and, then, as illustrated in FIG. 12, a portion of the electrode layer 130c may be removed using a porous material plate 600 to form a 1c electrode layer 131c.

After forming the 1c electrode layer 131c, the first external electrode 131 may be prepared by dipping the body on which the 1c electrode layer 131c is formed once again into the conductive paste, to form the first electrode layer 131d.

Therefore, the 1a and 1b electrode layers 131a and 131b may be sintered electrodes formed by a transfer process, and the 1c and 1d electrode layers 131c and 131d may be sintered electrodes formed by a dipping process.

If a region of the first external electrode 131 disposed on the third surface 3 of the body is defined as a first connection portion A1, a region of the first external electrode 131 disposed on the first and second surfaces 1 and 2 of the body is defined as a first band portion B1, and a region between the first connection portion and the first band portion is defined as a first corner portion C1, a thickness (D1) of the first corner portion may be 2.25 µm or more.

When the thickness (D1) of the first corner portion is less than 2.25 µm, the external electrode or the plating layer may be disconnected, and a penetration path of a plating solution, moisture, or the like may be formed, to deteriorate reliability for moisture resistance. Therefore, the thickness (D1) of the first corner portion may be 2.25 µm or more, and more preferably 2.3 µm or more.

An upper limit of the thickness D1 of the first corner portion is not particularly limited, and may be determined according to thicknesses of the 1a, 1b, and 1c electrode layers.

Further, when a thickness of the first corner portion is defined as D1 and a thickness of the first connection portion in a central portion of the body 110 in the first direction is defined as D2, D1/D2 may be 0.17 or more.

When D1/D2 is less than 0.17, the external electrode or the plating layer may be disconnected, and a penetration path of a plating solution, moisture, or the like may be formed, to deteriorate reliability for moisture resistance. Further, even in a case that the thickness D1 of the first corner portion is 2.25 µm or more, when D1/D2 is less than 0.17, the external electrode may become too thick. Therefore, D1/D2 may be 0.17 or more, and more preferably 0.19 or more.

If thicknesses of the 1a and 1b electrode layers 131a and 131b in a central portion of the body in the first direction (the Z direction) are defined as Ta1 and Tb1, respectively, and thicknesses of the 1a and 1b electrode layers 131a and 131b, at a point at which an internal electrode disposed at an outermost side in the first direction (the Z direction) is located, among the first and second internal electrodes 121 and 122, are defined as Ta2 and Tb2, respectively, Ta2/Ta1 may be 0.9 to 1.1, and Tb2/Tb1 may be 0.9 to 1.1. In this case, the thicknesses of the 1a and 1b electrode layers 131a and 131b may refer to distances of the 1a and 1b electrode layers 131a and 131b in the second direction (X direction).

The 1a and 1b electrode layers 131a and 131b may be formed by a transfer process, and thus may have a uniform thickness.

In addition, (Ta1+Tb1)/(Ta2+Tb2) may be 0.9 to 1.1, as both of the 1a and 1b electrode layers 131a and 131b are formed by a transfer process.

The sum of Ta2 and Tb2 may be 12 to 18 µm.

When the sum of Ta2 and Tb2 is less than 12 µm, a region in which a paste may be applied to a corner portion of the body may not be sufficiently secured. When the sum of Ta2 and Tb2 exceeds 18 µm, the external electrode may become too thick.

In addition, a thickness (Tc) of the 1c electrode layer may be 8 to 11 µm. In this case, the thickness (Tc) of the 1c electrode layer may refer to distances of the 1c electrode layer in the first direction (Z direction).

When the thickness (Tc) of the 1c electrode layer is less than 8 µm, a region in which a paste may be applied to a corner portion of the body may not be sufficiently secured. When the thickness (Tc) of the 1c electrode layer exceeds 11 µm, the external electrode may become too thick.

D1, D2, Tc, Ta1, Ta2, Tb1, and Tb2 may be measured by scanning an image of a cross-section in the third and first directions (an L-T cross-section) of the body 110, cut in a central portion of the body 110 in the width direction, scanned by a scanning electron microscope (SEM). D1 may be from the edge of the body where the third and first surfaces meet to the outer surface of the layer 131d. The direction to define D1 is perpendicular to the tangent of the outer surface of the layer 131d. D2 may be from center in the first direction of the third surface to the outer surface of the layer 131d. Tc may refer to maximum distances of the 1c electrode layer from first surface in the first direction (Z direction).

The first external electrode 131 may further include a plating layer 131e disposed on a portion of the 1c electrode layer 131c that is not covered by the 1d electrode layer 131d, and disposed on the 1d electrode layer 131d. Similarly, the second external electrode 132 may further include a plating layer 132e disposed on a portion of the 1c electrode layer 132c that is not covered by the 2d electrode layer 132d, and disposed on the 1d electrode layer 132d.

Since the 1d electrode layer 131d may be disposed to cover the portion of the 1c electrode layer 131c, the plating layer 131e of the first external electrode may be disposed on a portion of the 1d electrode layer 131d or a portion of the 1c electrode layer 131c, not covered by the 1d electrode layer 131d, among the 1d electrode layer 131d and the 1c electrode layer 131c.

The plating layers 131e and 132e may be a plating layer including one or more of nickel (Ni), tin (Sn), palladium (Pd), and alloys thereof, and may be formed as a plurality of layers.

For more specific examples of the plating layers 131e and 132e, the plating layers 131e and 132e may be nickel (Ni) plating layers, or tin (Sn) plating layers, may have a form in which the nickel (Ni) plating layers and the tin (Sn) plating layers are sequentially formed, and may have a form in which the tin (Sn) plating layer, the nickel (Ni) plating layer, and the tin (Sn) plating layer are formed sequentially. In addition, the plating layers 131e and 132e may include a plurality of nickel (Ni) plating layers and/or a plurality of tin (Sn) plating layers.

EXAMPLE

Table 1 below described a thickness (D1) of a first corner portion, a thickness (D2) of a first connection portion in a central portion of a body in a first direction, and a D1/D2 value, relating to Inventive Examples, and, as illustrated in FIG. 5, fifteen (15) sample chips (Test Nos. 1 to 15) were prepared by disposing the 1a electrode layer 131a and the 1b electrode layer 131b on the first connection portion A1, disposing the 1c electrode layer 131c on the first band portion B1, and forming the 1d electrode layer 131d, and D1 and D2 of the sample chips were measured and listed in Table 1.

Table 2 below described a thickness (D1') of a first corner portion, a thickness (D2') of a first connection portion in a central portion of a body in a first direction, and a D1'/D2' value, relating to Comparative Examples, and, as illustrated in FIG. 6, fifteen (15) sample chips (Test Nos. 16 to 30) were prepared by disposing the 1a electrode layer 131a, not the 1b electrode layer 131b, on the first connection portion A1, disposing the 1c electrode layer 131c' on the first band portion B1, and forming the 1d electrode layer 131d', and D1' and D2' of the sample chips were measured and listed in Table 2.

In addition, after a Ni plating operation was performed on the sample chips of Test Nos. 1 to 30, it was confirmed whether disconnection in Ni plating occurred, and the results thereof were illustrated in Tables 1 and 2 below.

TABLE 1

| Test No. | D2 (μm) | D1 (μm) | D1/D2 | Disconnection in Plating |
|---|---|---|---|---|
| 1 | 11.24 | 2.38 | 0.21 | X |
| 2 | 10.77 | 2.65 | 0.25 | X |
| 3 | 11.49 | 2.31 | 0.20 | X |
| 4 | 11.11 | 3.49 | 0.31 | X |
| 5 | 11.97 | 2.31 | 0.19 | X |
| 6 | 10.99 | 3.99 | 0.36 | X |
| 7 | 11.77 | 2.32 | 0.20 | X |
| 8 | 12.23 | 2.37 | 0.19 | X |

TABLE 1-continued

| Test No. | D2 (μm) | D1 (μm) | D1/D2 | Disconnection in Plating |
|---|---|---|---|---|
| 9 | 12.46 | 2.33 | 0.19 | X |
| 10 | 12.06 | 2.47 | 0.20 | X |
| 11 | 13.96 | 3.43 | 0.25 | X |
| 12 | 12.72 | 2.55 | 0.20 | X |
| 13 | 12.01 | 2.3 | 0.19 | X |
| 14 | 11.33 | 4.32 | 0.38 | X |
| 15 | 11.83 | 2.45 | 0.21 | X |

TABLE 2

| Test No. | D2' (μm) | D1' (μm) | D1'/D2' | Disconnection in Plating |
|---|---|---|---|---|
| 16 | 15.34 | 2.07 | 0.13 | O |
| 17 | 13.98 | 1.38 | 0.10 | O |
| 18 | 16.45 | 2 | 0.12 | O |
| 19 | 15.96 | 2.08 | 0.13 | O |
| 20 | 16.08 | 1.98 | 0.12 | O |
| 21 | 14.32 | 1.68 | 0.12 | O |
| 22 | 13.24 | 1.04 | 0.08 | O |
| 23 | 13.08 | 1.57 | 0.12 | O |
| 24 | 13.54 | 1.57 | 0.12 | O |
| 25 | 14.98 | 2.17 | 0.14 | O |
| 26 | 15.22 | 1.47 | 0.10 | O |
| 27 | 15.32 | 2.23 | 0.15 | O |
| 28 | 15.87 | 1.41 | 0.09 | O |
| 29 | 17.57 | 1.25 | 0.07 | O |
| 30 | 15.64 | 1.67 | 0.11 | O |

As can be seen from Table 1 and Table 2, in the case of Comparative Examples, disconnection in plating occurred. In addition, in the case of Comparative Examples, it was difficult to secure the thickness (D1') of the first corner portion to 2.25 μm or more, and it was confirmed that D1'/D2' was also less than 0.17.

In the case of Inventive Examples, it was confirmed that no disconnection in plating occurred in Test Nos. 1 to 15, and D1 was also secured at 2.25 μm or more, and D1/D2 was 0.17 or more.

One of the various effects of the present disclosure is to secure a thickness of a corner portion of an external electrode, to improve reliability for moisture resistance of the multilayer electronic component.

One of the various effects of the present disclosure is that a thickness of a connection portion may be made thinner than in the prior art, to improve capacitance per unit volume of the multilayer electronic component.

However, various advantages and effects of the present disclosure are not limited to the above, and may be more easily understood in the process of describing the specific embodiment of the present disclosure.

While example embodiments have been illustrated and described above, it will be apparent to those skilled in the art that modifications and variations could be made without departing from the scope of the present disclosure as defined by the appended claims.

What is claimed is:

1. A multilayer electronic component comprising: a body including a dielectric layer, and a first internal electrode and a second internal electrode alternately disposed in a first direction with the dielectric layer interposed therebetween, and including a first surface and a second surface opposing each other in the first direction, a third surface and a fourth surface connected to the first and second surfaces and opposing each other in a second direction, and a fifth surface and a sixth surface connected to the first to fourth surfaces and opposing each other in a third direction; and
  a first external electrode including a first electrode layer disposed on one of the third and fourth surfaces, a second electrode layer disposed on the first electrode layer, a third electrode layer disposed on the first and second surfaces, and a fourth electrode layer disposed on the second electrode layer and extending onto a portion of the third electrode layer,
  wherein the fourth electrode layer includes a conductive metal and glass, and is in direct contact with the second electrode layer and the third electrode layer, and
  among the first surface, the second surface, and the one of the third and fourth surfaces, the third electrode layer is disposed on only the first surface and the second surface.

2. The multilayer electronic component according to claim 1, wherein the first electrode layer comprises the same metal as the first internal electrode, and the second electrode layer comprises the same metal as the fourth electrode layer.

3. The multilayer electronic component according to claim 1, wherein the first internal electrode and the first electrode layer comprise Ni, and the second electrode layer and the fourth electrode layer comprise Cu.

4. The multilayer electronic component according to claim 1, wherein the first external electrode further comprises one or more additional electrode layers disposed between the second electrode layer and the fourth electrode layer.

5. The multilayer electronic component according to claim 1, wherein the first and second electrode layers are sintered electrodes formed by a transfer process, and the third and fourth electrode layers are sintered electrodes formed by a dipping process.

6. The multilayer electronic component according to claim 1, wherein, a region of the first external electrode disposed on the one of the third and fourth surfaces is defined as a connection portion, a region of the first external electrode disposed on the first and second surfaces is defined as a band portion, a region of the first external electrode between the first connection portion and the first band portion is defined as a corner portion, and a thickness of the corner portion is 2.25 µm or more.

7. The multilayer electronic component according to claim 6, wherein, the thickness of the corner portion is defined as D1, a thickness of the connection portion in a central portion of the body in the first direction is defined as D2, and D1/D2 is 0.17 or more.

8. A multilayer electronic component comprising:
  a body including a dielectric layer, and a first internal electrode and a second internal electrode alternately disposed in a first direction with the dielectric layer interposed therebetween, and including a first surface and a second surface opposing each other in the first direction, a third surface and a fourth surface connected to the first and second surfaces and opposing each other in a second direction, and a fifth surface and a sixth surface connected to the first to fourth surfaces and opposing each other in a third direction; and
  a first external electrode including a first electrode layer disposed on one of the third and fourth surfaces, a second electrode layer disposed on the first electrode layer, a third electrode layer disposed on the first and second surfaces, and a fourth electrode layer disposed on the second electrode layer and extending onto a portion of the third electrode layer,
  wherein the fourth electrode layer includes a conductive metal and glass, and is in direct contact with the second electrode layer and the third electrode layer, and
  thicknesses of the first and second electrode layers in a central portion of the body in the first direction are defined as Ta1 and Tb1, respectively, thicknesses of the first and second electrode layers, at a point at which an internal electrode disposed at an outermost side in the first direction is located, among the first and second internal electrodes, are defined as Ta2 and Tb2, respectively, Ta2/Ta1 is 0.9 to 1.1, and Tb2/Tb1 is 0.9 to 1.1.

9. The multilayer electronic component according to claim 8, wherein the Ta1, Ta2, Tb1, and Tb2 satisfy $0.9 \leq (Ta1+Tb1)/(Ta2+Tb2) \leq 1.1$.

10. The multilayer electronic component according to claim 8, wherein the sum of Ta2 and Tb2 is 12 to 18 µm.

11. The multilayer electronic component according to claim 1, wherein a thickness of the third electrode layer is 8 to 11 µm.

12. The multilayer electronic component according to claim 1, wherein the first external electrode further comprises a plating layer disposed on a portion of the third electrode layer that is exposed from the fourth electrode layer, and disposed on the fourth electrode layer.

13. The multilayer electronic component according to claim 1, further comprising a second external electrode including a fifth electrode layer disposed on another of the third and fourth surfaces, a sixth electrode layer disposed on the fifth electrode layer, a seventh electrode layer disposed on the first and second surfaces, and an eighth electrode layer disposed on the sixth electrode layer and extending onto a portion of the seventh electrode layer.

14. A multilayer electronic component comprising:
  a body including a dielectric layer, and a first internal electrode and a second internal electrode alternately disposed in a first direction with the dielectric layer interposed therebetween, and including a first surface and a second surface opposing each other in the first direction, a third surface and a fourth surface connected to the first and second surfaces and opposing each other in a second direction, and a fifth surface and a sixth surface connected to the first to fourth surfaces and opposing each other in a third direction; and
  a first external electrode including a first electrode layer disposed on one of the third and fourth surfaces, a second electrode layer disposed on the first electrode layer, a third electrode layer disposed on the first and second surfaces, and a fourth electrode layer disposed on the second electrode layer and extending onto a portion of the third electrode layer,
  wherein the fourth electrode layer includes a conductive metal and glass, and is in direct contact with the second electrode layer and the third electrode layer, and
  among the first surface, the second surface, and the one of the third and fourth surfaces, each of the first and second electrode layers is disposed on only the one of the third and fourth surfaces.

15. The multilayer electronic component according to claim 1, wherein the fourth electrode layer is a sintered electrode.

16. A multilayer electronic component comprising:
  a body including a dielectric layer, and a first internal electrode and a second internal electrode alternately disposed in a first direction with the dielectric layer interposed therebetween, and including a first surface and a second surface opposing each other in the first direction, a third surface and a fourth surface connected to the first and second surfaces and opposing each other in a second direction, and a fifth surface and a sixth surface connected to the first to fourth surfaces and opposing each other in a third direction; and a first external electrode including a first electrode layer disposed on one of the third and fourth surfaces, a second electrode layer disposed on the first electrode layer, a third electrode layer disposed on the first and second surfaces, and a fourth electrode layer disposed on the second electrode layer and extending onto a portion of the third electrode layer, wherein the first external electrode further comprises a plating layer disposed on the fourth electrode layer and directly on a portion of the third electrode layer.

17. The multilayer electronic component according to claim 16, wherein the first electrode layer comprises the same metal as the first internal electrode, and the second electrode layer comprises the same metal as the fourth electrode layer.

18. A multilayer electronic component comprising:

a body including a dielectric layer, and a first internal electrode and a second internal electrode alternately disposed in a first direction with the dielectric layer interposed therebetween, and including a first surface and a second surface opposing each other in the first direction, a third surface and a fourth surface connected to the first and second surfaces and opposing each other in a second direction, and a fifth surface and a sixth surface connected to the first to fourth surfaces and opposing each other in a third direction; and a first external electrode including a first electrode layer disposed on one of the third and fourth surfaces, a second electrode layer disposed on the first electrode layer, a third electrode layer disposed on the first and second surfaces, and a fourth electrode layer disposed on the second electrode layer and extending onto a portion of the third electrode layer, wherein, among the first surface, the second surface, and the one of the third and fourth surfaces, the third electrode layer is disposed on only the first and second surfaces, the third electrode covers an end of one or more of the first and second electrode layers in the first direction, the second electrode layer extends from the end of the first electrode layer to another end of the first electrode layer in the first direction, among the first surface, the second surface, and the one of the third and fourth surfaces, the second electrode layer is disposed on only the one of the third and fourth surfaces.

19. The multilayer electronic component according to claim 18, wherein the first electrode layer comprises the same metal as the first internal electrode, and the second electrode layer comprises the same metal as the fourth electrode layer.

20. The multilayer electronic component according to claim 18, wherein the first internal electrode and the first electrode layer comprise Ni, and the second electrode layer and the fourth electrode layer comprise Cu.

* * * * *